United States Patent
Noetzlin

Patent Number: 6,058,918
Date of Patent: May 9, 2000

[54] COMBUSTION CATALYST DEVICE FOR AN INTERNAL COMBUSTION ENGINE

[75] Inventor: Bernard Noetzlin, Chene-Bougeries, Switzerland

[73] Assignee: Financieres C. Vernes, Chene-Bougeries, Switzerland

[21] Appl. No.: 09/179,630

[22] Filed: Oct. 27, 1998

Related U.S. Application Data

[63] Continuation of application No. 08/624,550, filed as application No. PCT/FR95/01043, Aug. 2, 1995.

[51] Int. Cl.[7] ................................................ F02B 75/00
[52] U.S. Cl. ............................................ 123/670; 277/592
[58] Field of Search ..................... 123/668, 669, 123/670; 277/591, 592

[56] References Cited

U.S. PATENT DOCUMENTS

| | | | |
|---|---|---|---|
| 1,703,202 | 2/1929 | Moore . | |
| 2,926,649 | 3/1960 | Hicks | 123/668 |
| 3,408,995 | 11/1968 | Johnson . | |
| 3,648,676 | 3/1972 | Lowman, Jr. | 123/670 |
| 4,121,543 | 10/1978 | Hicks, Jr. et al. . | |
| 4,317,576 | 3/1982 | Barker et al. | 277/600 |
| 4,530,340 | 7/1985 | Totman | 123/669 |
| 4,577,611 | 3/1986 | Hagino | 123/669 |
| 4,741,965 | 5/1988 | Zerfass et al. | 428/447 |
| 4,773,368 | 9/1988 | Pfefferle | 123/272 |
| 4,811,707 | 3/1989 | Pfefferle | 123/272 |
| 4,819,595 | 4/1989 | Pfefferle | 123/272 |
| 4,998,517 | 3/1991 | Kawamura . | |
| 5,001,007 | 3/1991 | Zerfass et al. | 428/328 |
| 5,146,881 | 9/1992 | Pfefferle . | |
| 5,425,236 | 6/1995 | Haerle | 60/302 |
| 5,722,379 | 3/1998 | Binder et al. | 123/668 |
| 5,806,483 | 9/1998 | Mitarai et al. | 123/299 |

FOREIGN PATENT DOCUMENTS

| | | |
|---|---|---|
| 1 066 721 | 6/1954 | France . |
| 33 31 579 | 3/1985 | Germany . |
| 41 22 122 | 7/1992 | Germany . |

*Primary Examiner*—Noah P. Kamen
*Assistant Examiner*—Hai Huynh
*Attorney, Agent, or Firm*—Young & Thompson

[57] ABSTRACT

A combustion catalyst device for an internal combustion engine of the type including an engine unit a cylinder head, and a cylinder head gasket, including multilayered crimp or crimpless seals arranged therebetween, and cylinders, each housing a moving piston defining a combustion chamber. The catalyst is deposited on a catalyst support disposed in the combustion chamber at a position level with the edge of the cylinder head gasket.

30 Claims, 5 Drawing Sheets

6,058,918

COMBUSTION CATALYST DEVICE FOR AN INTERNAL COMBUSTION ENGINE

CROSS-REFERENCE TO RELATED APPLICATIONS

This application is a continuation of copending application Ser. No. 08/624,550, filed May 31, 1996, which was the 35 USC 371 national phase of International application PCT/FR95/01043 filed on Aug. 2, 1995, which designated the United States.

BACKGROUND OF THE INVENTION

1. Field of the Invention

The invention is related to a combustion catalyst device for an internal combustion engine.

2. Description of Background and Relevant Information

The current problems of pollution generated by internal combustion engines are well known, whether such engines use fuels comprising gas, gas-oil, liquefied petroleum gas or compressed natural gas. Emissions emanating from these internal combustion engines are of several types, including unburnt hydrocarbons, carbon monoxides, nitrogen oxides and particles.

Systems already exist that make it possible to reduce certain emissions. For instance, injection systems associated with an electronic control allow for loop-through operations. In these systems, a probe placed in the exhaust makes it possible to analyze the gases and control the determination during intake, in association with a catalytic muffler and in manner so as to make it work by oxidation or reduction with the highest efficiency.

In practice, conventional catalysts can be started, as is the case for oxygen probes, only if the temperature of the exhaust gases and the catalytic structure are sufficiently high. Heating systems have been developed to be arranged immediately upstream of the catalysts, but such systems remain complex and expensive.

Unburnt hydrocarbon emissions result essentially from four factors:

a) the quality of the combustion itself;

b) trapping of the hydrocarbons in the ullages of the combustion chamber which are very difficult to reach for complete burning;

c) the phenomena of hydrocarbon absorption/desorption in the oil films; and d) the deposits capable of constituting substantial hydrocarbon retaining sources.

The trapping of the hydrocarbons in the ullages, which are difficult to reach for complete burning, constitutes the major source of unburnt gases that can reach up to 70% of the total evacuated hydrocarbons. The ullages are located between the first bearer and the cylinder and in the fire rings. The critical micro-volumes in the vicinity of the seats and valves are also a part of the ullages.

In the case of diesel engines, substantial quantities of unburnt particles are formed. If these particles are in hot zones, they will burn in the presence of oxygen. Those that could not burn are found in the exhaust conduits downstream of the combustion chambers.

In the case of natural gas, the emissions are essentially composed of methane, even with the use of catalytic converters. Indeed, the atoms of the methane molecule have very substantial bond strengths and the rate of combustion is low, which explains these high levels of emission.

SUMMARY OF THE INVENTION

An object of the invention is to treat the combustion gases, in a catalytic fashion, directly in the combustion chamber. Another object is to provide a solution that operates in a cold engine, from the first revolutions of the engine. A further object of the invention is that the system remains inexpensive and it can be adapted to all types of internal combustion engines.

In addition, the solution proposed by the invention must allow for an adaptation, regardless of the type of cylinder head gasket used, including multilayered crimp or crimpless seals.

In this fashion, a combustion catalyst device is adapted for an internal combustion engine of the type comprising an engine unit a cylinder head and a cylinder head gasket, including multilayered crimp or crimpless seals arranged therebetween, and cylinders, each housing a moving piston defining a combustion chamber. The catalyst is deposited on a catalyst support disposed in the combustion chamber at a position level with the edge of the cylinder head gasket.

According to a particular embodiment, the catalyst support is the crimp or the fire ring of the cylinder head gasket itself. The support can be an element attached to the crimp or integrated therein.

In certain cases, this attached element projects in the combustion chamber and is spaced from the crimp level with the edge of the cylinder head gasket so as to provide an ullage forming a thermal shield between this crimp and this element. According to a particular embodiment regarding a crimpless multilayered cylinder head gasket, the catalyst support is an appendage formed by the projection, in the combustion chamber, of a portion of at least one of the layers of this gasket.

According to a variation of this particular embodiment, at least one of the layers is deformed to form a shield on the outer surface from which the catalyst is deposited.

According to an improvement of the invention, the device comprises heating means that are arranged in the immediate vicinity of the catalyst support. These heating means are isolated from the combustion chamber by the catalyst support.

According to a particular embodiment, the heating elements comprise an electrical resistance. The support and/or the heating means are possibly arranged on one or more sectors on the periphery of the edge of the cylinder head gasket.

BRIEF DESCRIPTION OF THE DRAWINGS

The invention is described hereinafter, according to a particular non-limiting embodiment of the invention, with reference to the annexed drawings in which.

DETAILED DESCRIPTION OF THE PREFERRED EMBODIMENTS

Figure 1:
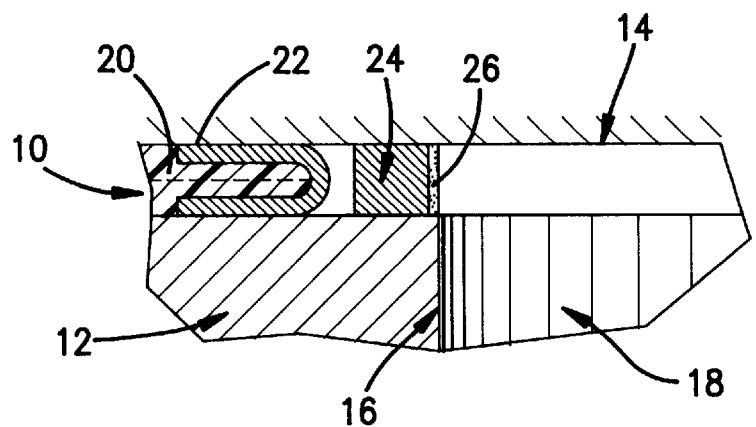
FIG. 1 is a schematic cross-sectional view of a cylinder with an attached catalyst support.

FIG. 1 shows a schematic view of a cylinder head gasket 10, mounted between an engine unit 12 and a cylinder head 14. In this figure, a portion of the cylinder 16 appears in which a piston, not shown for simplification reasons, determines the variable volume referred to as combustion chamber 18.

The cylinder head gasket 10, in a known system, comprises a matrix 20 and a metallic crimp portion 22, which is positioned at a vicinity of the edge of the combustion chamber, and specifically, at the periphery of the combustion chamber.

In the following description, the catalyst support will be referenced by the numeral 24. In FIG. 1, the catalyst support 24 is an attached element of the annular type, concentrically arranged at the crimp 22 with a catalyst layer 26 on the surface and in contact with the combustion chamber 18, i.e., exposed to the combustion chamber.

Figure 1A:
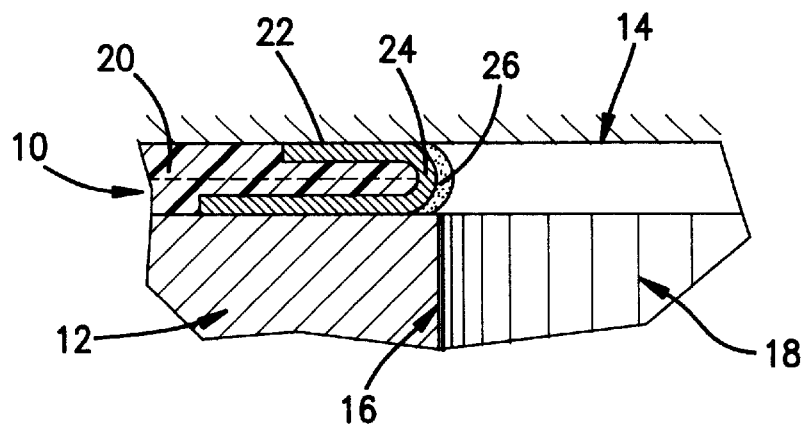
FIG. 1A is a schematic cross-sectional view of a cylinder with a catalyst support constituted by the crimp itself.

In the embodiment of FIG. 1A, the catalyst support 24 is the outer surface of the crimp 22 of the cylinder head gasket, i.e., the surface placed in contact with the combustion chamber 18. Thus, in this embodiment, the catalyst support is integrated into the crimp of the gasket. The catalyst 26 is deposited on the support by any appropriate means, and in this case, it is a projection or quenched deposit.

The catalytic structure generally comprises a steel or ceramic porous matrix associated with noble metals. Thus, in the example shown, the support is metallic and is coated with a layer "rendered" porous which is, in turn, coated with metals or materials having a catalytic effect such as platinum, palladium or rhodium.

Figure 2:
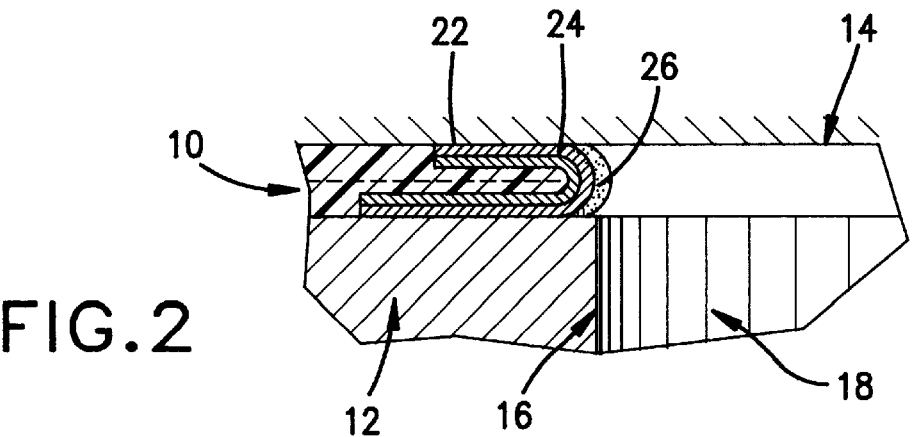
FIG. 2 is a cross-sectional view of a variation of the support according to the invention.
Figure 3:
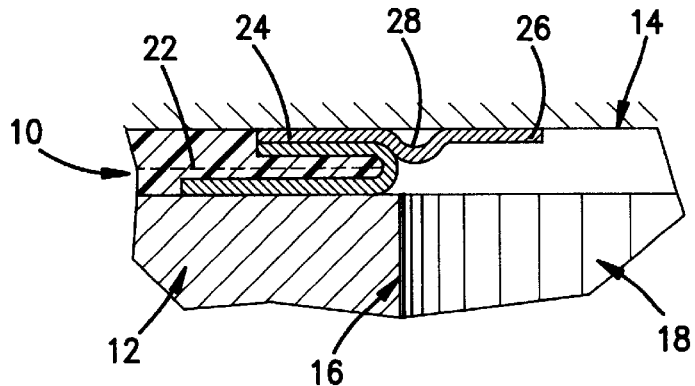
FIG. 3 is a cross-sectional view of another variation with a support projecting in the combustion chamber.
Figure 4:
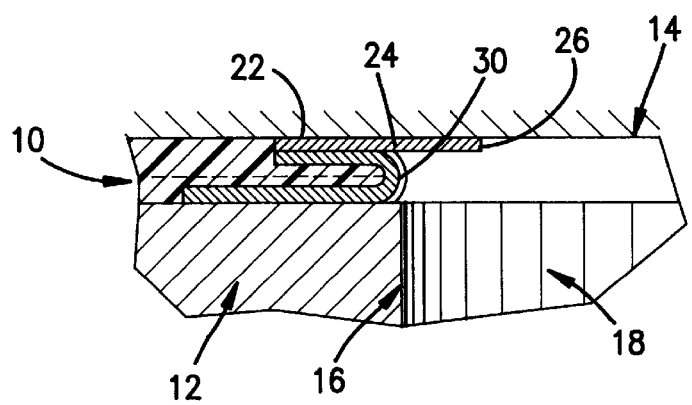
FIG. 4 is a cross-sectional view of a variation of the form of the crimp itself.

In FIGS. 2, 3 and 4, the catalyst support 24 is modified in its form. In FIG. 2, the support 24 has a profile that is identical to that of the crimp 22, and it is superimposed on the outer surface thereof, in the manner of a double crimp.

The variation of FIG. 3 shows a support that is also blocked between the crimp 22 and the cylinder head 14, but it extends toward the inside of the combustion chamber 18. The developed surface, upon contact with the gases contained in the combustion chamber 18, is very substantial. A deformation 28 of the stamping type, provided level with the edge of the cylinder head gasket, imparts, to the portion of this support projecting in the combustion chamber 18, an elastic effect which tends to press it against the cylinder head 14. This deformation allows for an efficient centering of this support with respect to the crimp.

The catalyst is deposited, as in the preceding embodiments, on the surface opposite the combustion chamber 18. In FIG. 4, the crimp 22 has a particular profile, such that a wing 30 projects in the combustion chamber. The wing 30 is obtained by bending the crimp 22 into an S-shape. The wing 30 is likewise pressed on the cylinder head so as to limit the disturbances in the combustion chamber 18, and to prevent any contact with the moving elements in the cylinder 16.

Figure 5:
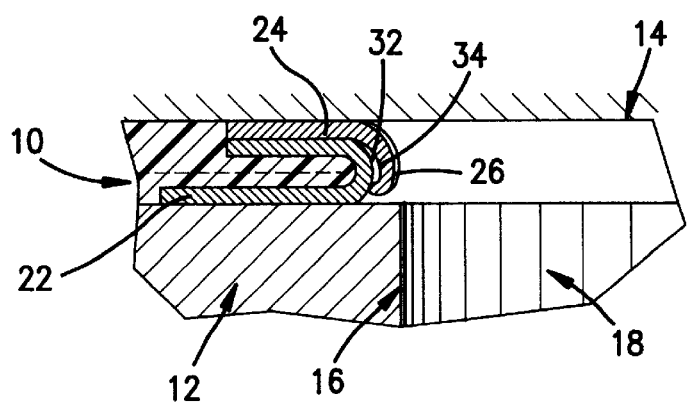
FIGS. 5 and 5A are variations with an ullage forming a thermal shield arranged respectively in the upper portion and in the lower portion.
Figure 5A:
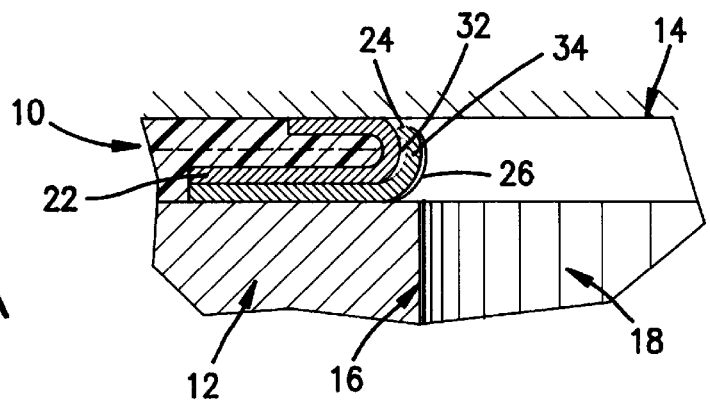

The catalyst support of 24 FIGS. 5 and 5A is characterized in that the support is spaced apart from the crimp 22. An ullage forming a thermal shield 32 is thus provided. The support 24 comprises a wing 34 folded back around the crimp 22 of the cylinder head gasket. In the variation of FIG. 5, the wing 34 is blocked by its heel between the gasket 10 and the cylinder head 14, and the wing 34 is folded back downwardly, whereas in the variation of FIG. 5A, the heel is blocked between the engine unit 12 and the cylinder head gasket 10, the wing 34 being folded back upwardly.

Figure 6:
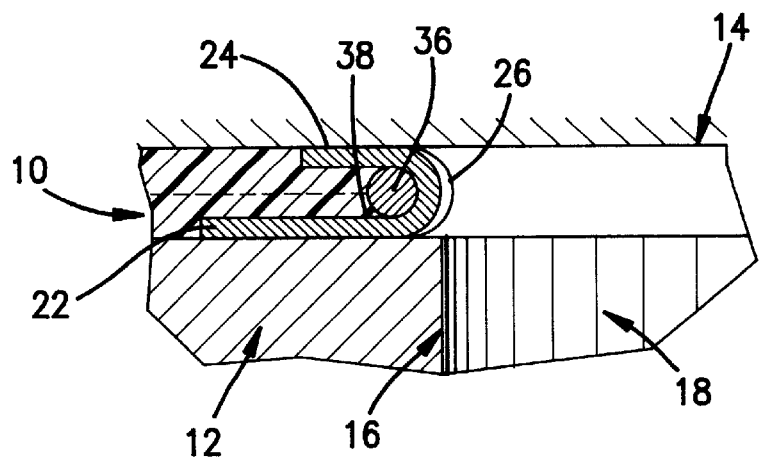
FIGS. 6 and 7 are variations with heating means.

In FIG. 6, an alternative embodiment is shown with a support 24 and means 36 for heating this support. Heating means 36 comprises an electric resistance 38 mounted beneath the crimp 22, which isolates resistance 38 from the combustion chamber. The crimp 22 constitutes the catalyst support as in the variation of FIG. 1.

Figure 7:
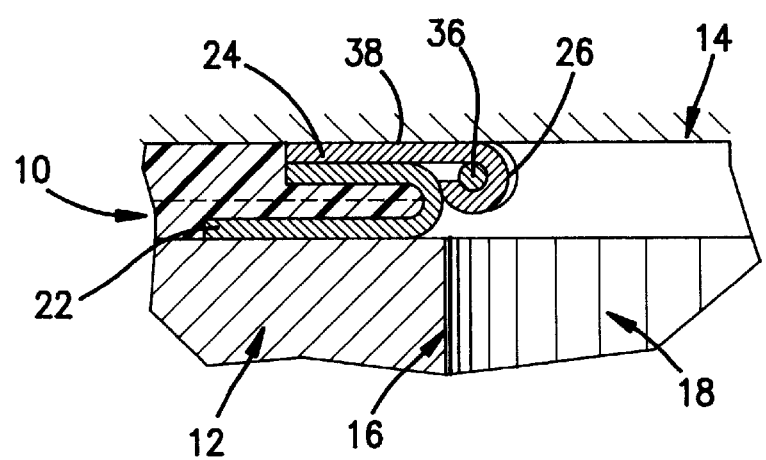

In FIG. 7, the resistance 38 is arranged in a catalyst support 24 independent of the crimp 22. In this case, the support projects within the combustion chamber 18.

Figure 8:
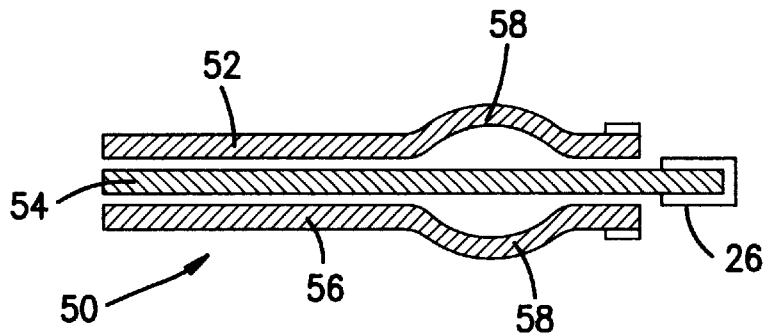
FIGS. 8, 9, 10, and 11 are variations of embodiment in the case of multilayered seals.

FIG. 8 shows a multilayered seal 50, comprising a metallic only or metal-elastomer composite. Seal 50 comprises, in a known fashion, a plurality of superimposed layers, in this case three layers 52, 54, and 56, arranged respectively at the upper portion, median portion and lower portion. In the embodiment shown in FIG. 8, the median layer 54 is extended by an appendage 26 originated from the layer itself, projecting in the combustion chamber, this appendage forming the catalyst support itself. The catalyst can also be arranged, in a complementary fashion, on the upper and lower surfaces of the upper layer and lower layer, for the portion that is inside the combustion chamber. It is noted that the boss 58 of the layers enabling the seal to ensure the sealing, is borne by the upper layer and the lower layer.

Figure 9:
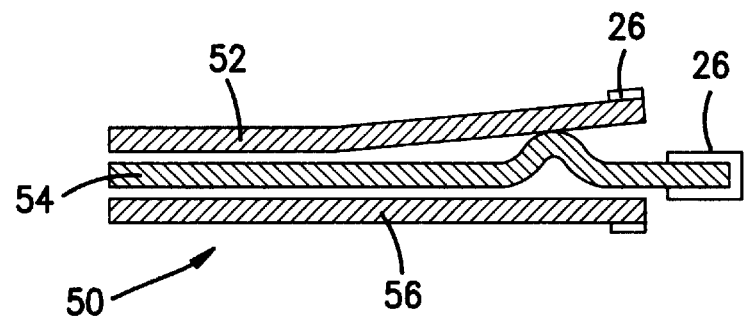

In FIG. 9, the only difference consists in providing the sealing boss solely on the median layer, one of the upper and lower layers being folded, the other planar.

Figure 10:
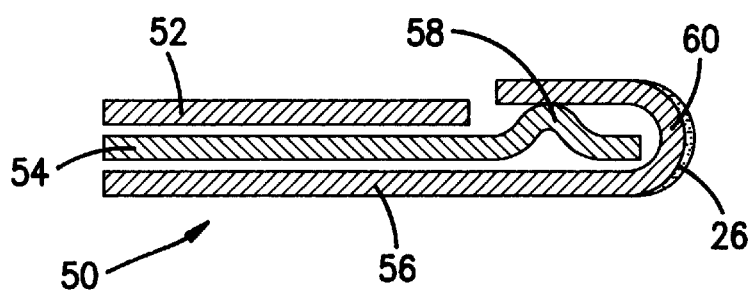

The variation of FIG. 10 provides a folded lower layer, forming a shield 60, around the median layer so as to join the upper layer that is set back from this median layer. The boss is borne by the sole median layer and the catalyst 26 is borne by the outer surface of the shield.

Figure 11:
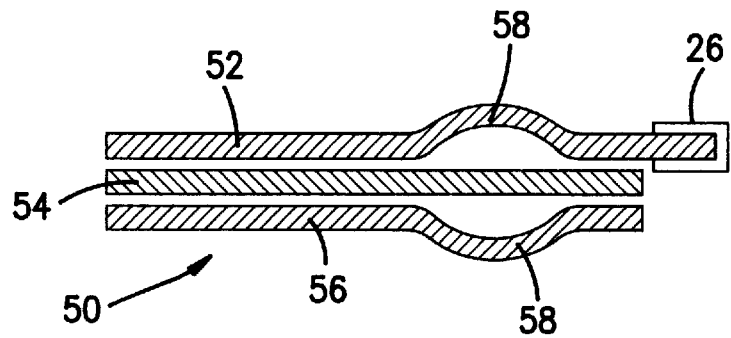

For the variation of FIG. 11, it is noted that the catalyst 26 is borne by the upper layer that is projecting with respect to the other layers.

Figure 12A:
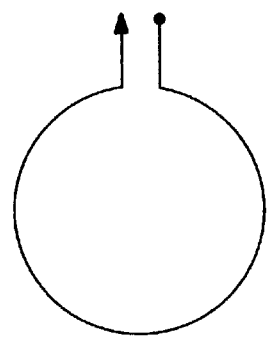
FIGS. 12A and 12B are diagrams of complete resistances with sectors.
Figure 12B:
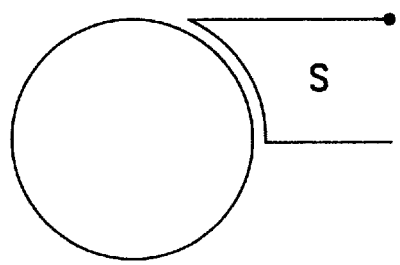

Such a variation makes it possible to place the layer carrying the catalyst in the immediate vicinity of the upper portion of the combustion chamber, without hindering the displacement of the piston. This variation has a real advantage in certain applications. In FIG. 12A, the resistance is represented schematically. In FIG. 12B, the resistance is only provided on a sector S of the periphery of the combustion chamber.

Figure 13:
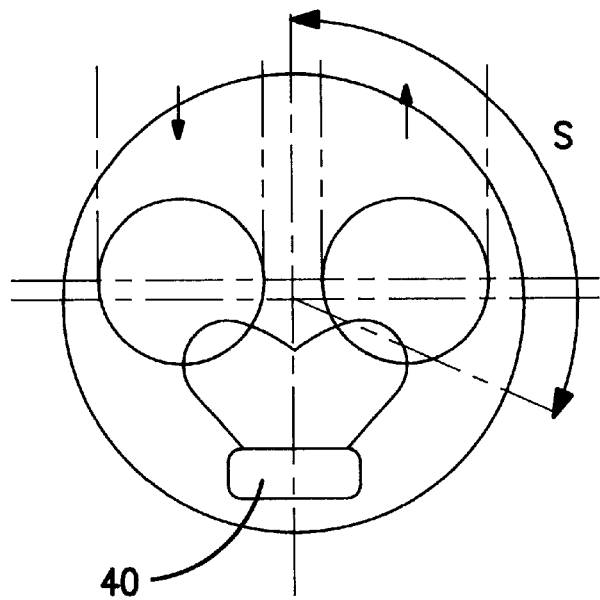
FIGS. 13 and 14 are schematic representations of the resistance positions and catalyst deposits.

In the case of prechamber diesel engines, shown in FIG. 13, there is a combustion prechamber 40, and the gas catalytic treatment has an advantage being in the vicinity of the exhaust valve. In the case of prechamber diesel engines, the heated sector S is limited.

Figure 14:
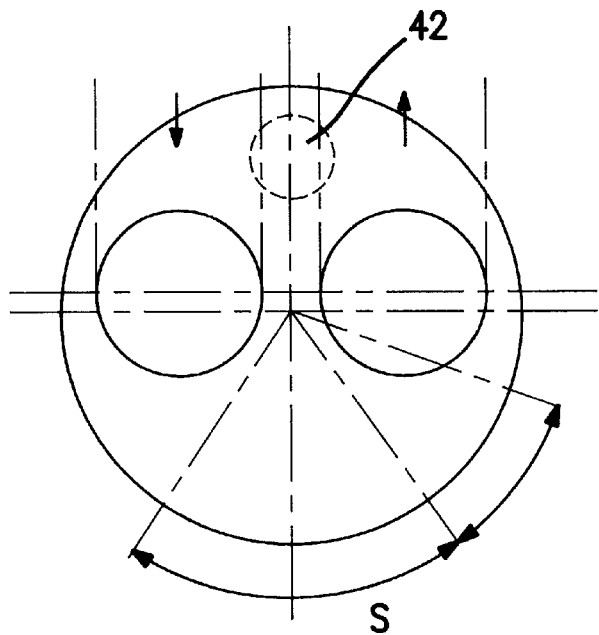

FIG. 14 relates to engines with spark ignition and shows the heating of sector S opposite the spark plug 42. This local electric heating can be controlled electronically by the engine computer and by a specific electronic box. This supply of heat presents a particular interest in cold temperatures, during starts or certain ranges of operation, at low load for example. The energy to be supplied is of a few hundred watts at the maximum. Indeed, this quantity is adapted as a function of the material, specific heat, the heated mass, the activity and quantity of the catalytic noble materials, and the desired temperature difference. The catalytic elements thus localized in the combustion chamber can be deposited by more sophisticated means such as vacuum deposition, which makes it possible to impregnate the surfaces to be treated and to improve the bonding. These catalytic elements are deposited on metallic or ceramic primary layers having, after treatment, large impregnation surfaces. Any attached element or any element demarcating the combustion chamber, or a combination of both, can be envisioned as a support.

What is claimed is:

1. A combustion catalyst device for use intermediate a catalyst-free engine unit combustion chamber opening and an associated catalyst-free cylinder head, comprising:

a catalyst peripheral support shaped to match the engine unit combustion chamber opening, with a support interior surface defining a support interior area greater than an area of the combustion chamber opening; and a catalyst layer supported on said catalyst peripheral support shaped to match the engine unit combustion chamber opening, with a catalyst interior surface defining a catalyst interior area equal to the area of the combustion chamber opening and with the catalyst layer being limited to essentially to a perimeter of the combustion chamber opening, wherein said combustion catalyst device is adapted for insertion and use intermediate the catalyst-free engine unit combustion chamber opening and the catalyst-free associated cylinder head.

2. A combustion catalyst device for use intermediate a catalyst-free engine unit combustion chamber opening and an associated catalyst-free cylinder head, comprising:

a catalyst peripheral support shaped to have an interior edge parallel to a contour of a peripheral edge of the engine unit combustion chamber opening; and a catalyst layer supported on said catalyst peripheral support, said catalyst layer having an exterior surface adjacent said interior edge and an interior edge exposed on the peripheral edge of the combustion chamber and generally aligned with the contour of the peripheral edge, wherein the combustion catalyst device is adapted for insertion and use intermediate the catalyst-free engine unit combustion chamber opening and the catalyst-free associated cylinder head, and wherein said catalyst layer is essentially limited to the peripheral edge of the combustion chamber.

3. A combustion catalyst device according to claim 2, wherein:

said catalyst support further comprises a crimp with an surface designed and constructed to align with a cylinder head gasket surface.

4. A combustion catalyst device according to claim 3, wherein:

said catalyst support is designed and constructed to extend from an edge of the cylinder head gasket into the combustion chamber.

5. A combustion catalyst device according to claim 3, wherein:

said catalyst support is designed and constructed to form an ullage intermediate said crimp and the cylinder head gasket to form a thermal shield.

6. A combustion catalyst device according to claim 2, wherein:

said catalyst support comprises a surface designed and constructed to be affixed to a cylinder head gasket crimp surface.

7. A combustion catalyst device according to claim 1, further comprising:

a cylinder head gasket, said cylinder head gasket comprising a crimp positionable adjacent a periphery edge of the combustion chamber; and wherein said catalyst support is integral with said crimp of said cylinder head gasket.

8. A combustion catalyst device according to claim 1, further comprising:

a crimpless cylinder head gasket having multiple layers; and one of said multiple layers including an appendage projecting peripherally into the combustion chamber.

9. A combustion catalyst device according to claim 8, wherein:

at least one of said layers is deformed to form a shield, said catalyst being deposited on an outer surface of said shield.

10. A combustion catalyst device according to claim 1, further comprising:

a heating device positioned adjacent said catalyst support.

11. A combustion catalyst device according to claim 10, wherein:

said heating device is positioned to be separated from the combustion chamber by said catalyst support.

12. A combustion catalyst device according to claim 11, wherein:

said heating device comprises an electrical resistance.

13. A combustion catalyst device according to claim 12, wherein:

at least one of said support and said heating device is designed and adapted for being arranged on at least one sector on the peripheral edge of the cylinder head gasket.

14. A combustion catalyst device according to claim 1, wherein:

said catalyst layer is supported on said catalyst support to form an annular structure exposed to the combustion chamber only along the peripheral edge of said combustion chamber.

15. An engine unit comprising:

a cylinder head;

at least one cylinder having a combustion chamber housing a movable piston;

a cylinder head gasket with an opening positioned intermediate said cylinder head and said combustion chamber;

a catalyst support positioned along a periphery of said combustion chamber on a plane extending from an edge of said opening of said cylinder head gasket; and a catalyst layer supported on said catalyst support exposed to said combustion chamber along said periphery of said combustion chamber, wherein said combustion chamber and said cylinder head are free of any catalyst material and said catalyst layer is limited to the periphery of said combustion chamber.

16. An engine unit according to claim 15, wherein:

said cylinder head gasket further comprises a crimp.

17. An engine unit according to claim 16, wherein:

said catalyst support is comprised by said crimp of said cylinder head gasket.

18. An engine unit according to claim 16, wherein:

said catalyst support is affixed to said crimp.

19. An engine unit according to claim 16, wherein:
said catalyst support is integral with said crimp.

20. An engine unit according to claim 16, wherein:
said catalyst support extends from an edge of said gasket into said combustion chamber.

21. An engine unit according to claim 16, wherein:
said catalyst support is spaced from said crimp and positioned on a plane even with the edge of said cylinder head gasket to provide an ullage to form a thermal shield.

22. An engine unit according to claim 15, wherein:
said cylinder head gasket further comprises a crimpless multilayered seal.

23. An engine unit according to claim 22, wherein:
said catalyst support comprises an appendage formed by a projection of a portion of at least one layer of said multilayered cylinder head gasket in said combustion chamber.

24. An engine unit according to claim 22, wherein:
at least one of said layers is deformed to form a shield, said catalyst being deposited on an outer surface of said shield.

25. An engine unit according to claim 15, wherein:
said heating device is separated from said combustion chamber by said catalyst support.

26. An engine unit according to claim 15, wherein:
said heating device comprises an electrical resistance.

27. An engine unit according to claim 26, wherein:
at least one of said support and said heating device is arranged on at least one sector on a peripheral edge of said cylinder head gasket.

28. An engine unit according to claim 27, further comprising:
a heating device positioned in the immediate vicinity of said catalyst support.

29. An engine unit according to claim 28, wherein:
said engine unit is an internal combustion engine.

30. An engine unit according to claim 15, wherein:
said catalyst layer is supported on said catalyst support to form an annular structure exposed to said combustion chamber only along said peripheral edge of said combustion chamber.

* * * * *